United States Patent
Ashiura et al.

(10) Patent No.: US 7,956,134 B2
(45) Date of Patent: Jun. 7, 2011

(54) MODIFIED BUTYL RUBBER COMPOSITION

(75) Inventors: Makoto Ashiura, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 480 days.

(21) Appl. No.: 12/103,810

(22) Filed: Apr. 16, 2008

(65) Prior Publication Data

US 2008/0262147 A1 Oct. 23, 2008

(30) Foreign Application Priority Data

Apr. 19, 2007 (JP) ................. 2007-110605

(51) Int. Cl.
*C08C 19/22* (2006.01)
*C08C 19/34* (2006.01)
*C08F 8/30* (2006.01)

(52) U.S. Cl. ......... 525/374; 525/383; 525/244; 525/184

(58) Field of Classification Search .................. 525/374, 525/184, 244, 383
See application file for complete search history.

(56) References Cited

U.S. PATENT DOCUMENTS

| 2005/0222343 A1 | 10/2005 | Ashiura et al. | |
| 2006/0155079 A1 | 7/2006 | Ashiura et al. | |
| 2006/0160956 A1 | 7/2006 | Ashiura et al. | |
| 2009/0093587 A1* | 4/2009 | Ashiura et al. | ................ 524/572 |

FOREIGN PATENT DOCUMENTS

| JP | 06-172547 | 6/1994 |
| JP | 2007231244 | 9/2007 |
| WO | WO-2006/032765 | 3/2006 |

OTHER PUBLICATIONS

International Search Report issued on related European Application No. EP 08006049.4 on Jul. 22, 2008.

* cited by examiner

*Primary Examiner* — Ling-Siu Choi

(74) *Attorney, Agent, or Firm* — Connolly Bove Lodge & Hutz LLP

(57) ABSTRACT

A modified butyl rubber composition containing a modified butyl rubber obtained by a modification reaction of a compound (a) having a nitroxide-free radical, stable in the presence of oxygen at an ordinary temperature, in the molecule thereof and a radical initiator (b) and at least two kinds of bi- or more-functional radical polymerizable monomers (c).

5 Claims, No Drawings

MODIFIED BUTYL RUBBER COMPOSITION

RELATED APPLICATIONS

This application claims priority to Japanese Application No. 2007-110605 filed Apr. 19, 2007, disclosure of which is incorporated herein by reference.

TECHNICAL FIELD

The present invention relates to a modified butyl rubber composition, more specifically relates to a modified butyl rubber composition capable of cross-linking with a radical initiator and of inexpensively improving the tensile properties of a modified butyl rubber composition.

BACKGROUND ART

A butyl rubber has an extremely low degree of unsaturation and therefore, is superior in weather resistance, heat resistance, ozone resistance, etc. and has a low air permeability. Accordingly, the butyl rubber is being used as sealants, binders, etc. As the method of cross-linking a butyl rubber, sulfur cross-linking, quinoid cross-linking, resin cross-linking, etc. are known, but it is hard to say that practically satisfactory results are obtained by any method at present. That is, the sulfur cross-linking requires cross-linking at a high temperature over a long time. Further the quinoid cross-linking usually uses harmful red lead as an oxidant for activating the quinoid, and therefore, has environmental problems. Further, the resin cross-linking is remarkably slow in reaction rate and requires heating at a high temperature for a long time. The product is liable to be formed in a state not completely cross-linked, and therefore, there are the problems that, during use, the cross-linking reaction is liable to proceed and the physical properties are liable to be greatly changed. Further, among these cross-linking methods of diene-based rubber, etc., cross-linking by an organic peroxide extremely superior in the heat resistance is not being used much at all as a method of cross-linking butyl rubber. This is because, if this cross-linking is applied to a butyl rubber, the decomposition reaction of the main chain is liable to predominantly occur and the rubber is liable to be conversely softened, rather than the cross-linking. On the other hand, partially cross-linked butyl rubber is commercially available as a butyl rubber for which peroxide cross-linking is possible, but this has the problem that the processability is not sufficient. Further, Patent Document 1 discloses the method for cross-linking un-cross-linked butyl rubber in the presence of an organic peroxide and a polyfunctional monomer having electron acceptor groups, but according to this method, severe reversion is liable to occur.

Under these circumstances, the inventors previously proposed a modified rubber composition superior in weather resistance, heat resistance, ozone resistance, etc. and enabling an ordinary butyl rubber having a low air barrier property to be cross-linked with an organic peroxide (see Patent Document 2).

Patent Document 1: Japanese Patent Publication (A) No. 6-172547
Patent Document 2: Japanese Patent Application No. 2006-131780

DISCLOSURE OF THE INVENTION

Accordingly, an object of the present invention is to inexpensively obtain a modified rubber composition capable of being cross-linked with an organic peroxide and of further improving the tensile properties of the modified rubber composition.

In accordance with the present invention, there is provided a modified butyl rubber composition comprising (I) a modified butyl rubber, obtained by a modification reaction of a compound (a) having a nitroxide-free radical, stable in the presence of oxygen, at an ordinary temperature, in the molecule thereof and a radical initiator (b) and at least two kinds of bi- or more-functional radical polymerizable monomers (c).

According to the present invention, to ordinary butyl rubber, by adding and reacting a compound (a) having a nitroxide-free radical in the molecule thereof, which is stable at an ordinary temperature (e.g., a room temperature) even in the presence of oxygen, such as a TEMPO derivative, and a radical initiator, then adding and reacting a bi- or more-functional radical polymerizable monomer and an organic peroxide to a modified butyl rubber, to which the above compound having a nitroxide-free radical in the molecule thereof is grafted, the same cross-linking reaction proceeds and a cross-linked product having high tensile properties can be obtained even if the total weight of the radical polymerizable monomer is decreased.

BEST MODE FOR CARRYING OUT THE INVENTION

The inventors previously engaged in intensive studies to enable an ordinary butyl rubber to be cross-linked with an organic peroxide and, as a result, proposed a modified butyl rubber composition containing a modified butyl rubber obtained by adding and reacting a compound (a) having a nitroxide-free radical in the molecule thereof, stable at ordinary temperature even in the presence of oxygen, such as a TEMPO derivative, and a radical initiator (b) with the ordinary butyl rubber, then adding and reacting one type of a bi- or more-functional radical polymerizable monomer (c) and further a modified butyl rubber composition containing a modified butyl rubber obtained by the reaction of the compound (a), the radical initiator (b) and one type of a bi- or more-functional radical polymerizable monomer (c) with a butyl rubber, but engaged in further research and, as a result, found that, by using the two or more radical polymerizable monomers (c), it is possible to improve the tensile properties of the cross-linked product even with a small amount of the use of the radical polymerizable monomer (c).

The butyl rubber modified according to the present invention is a copolymer rubber of isoprene, which is conventionally called "butyl rubber (IIR)", and a small amount of isoprene in an amount of, for example, 0.6 to 2.5 mol % of the rubber as a whole or the derivatives thereof, such as a chlorinated butyl rubber, brominated butyl rubber. These are well known in the art. There are also many commercially available products.

The compound (a) having nitroxide radicals in the molecule, stable in the presence of oxygen at an ordinary temperature used in the present invention is not limited to these, but the following compounds may be illustrated:

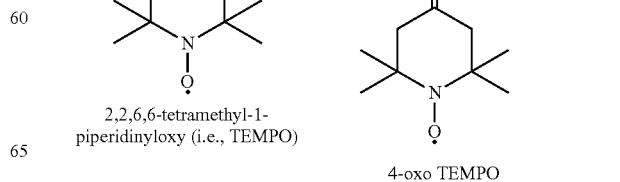

Formula 1

2,2,6,6-tetramethyl-1-piperidinyloxy (i.e., TEMPO)

4-oxo TEMPO

Formula 2
General formulae

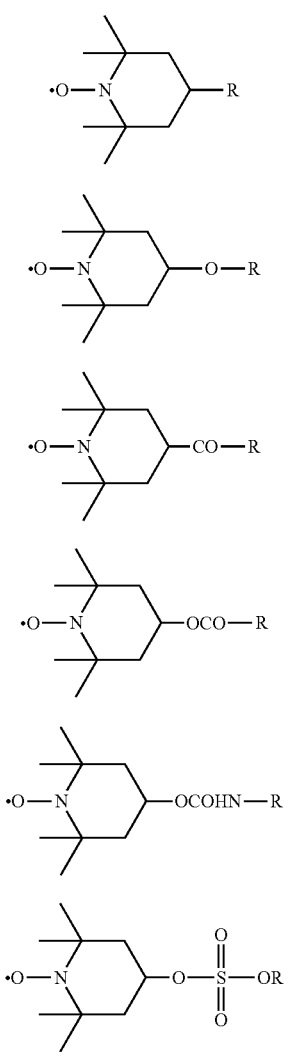

in the formulae (1) to (6), R indicates functional group-containing organic group, such as a $C_1$ to $C_{30}$ alkyl group, allyl group, amino group, isocyanate group, hydroxyl group, thiol group, vinyl group, epoxy group, thiirane group, carboxyl group, carbonyl group-containing group (e.g., anhydrous succinic acid, anhydrous maleic acid, anhydrous glutaric acid, anhydrous phthalic acid, and other cyclic acid anhydrides), amide group, ester group, imide group, nitrile group, thiocyan group, $C_1$ to $C_{20}$ alkoxy group, silyl group, alkoxysilyl group, nitro group.

Formula 3

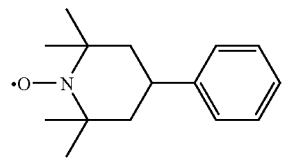

4-phenylTEMPO

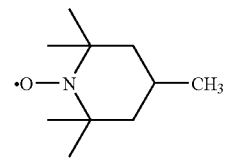

4-methylTEMPO

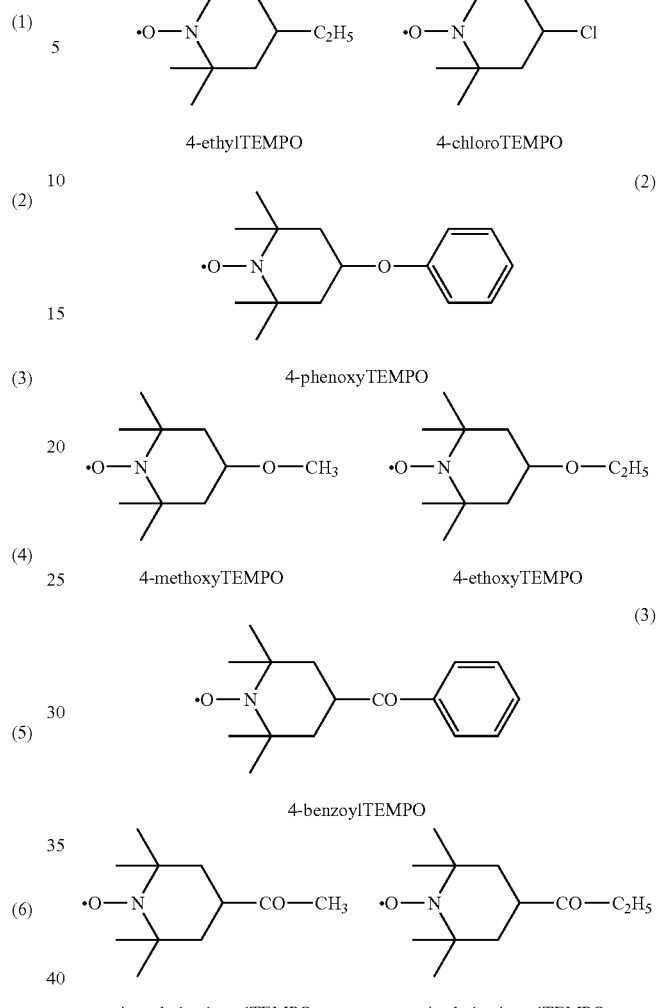

Formula 4
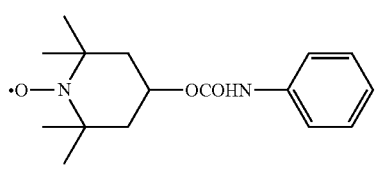
4-(N-phenylcarbamoyloxy) TEMPO
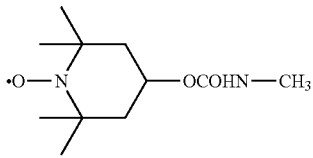
4-(N-methylcarbamoyloxy) TEMPO
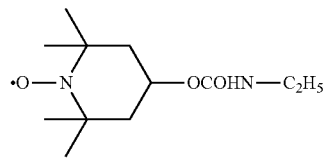
4-(N-ethylcarbamoyloxy) TEMPO
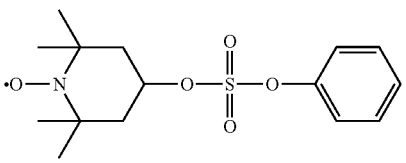
Phenyl (4-TEMPO) sulfate
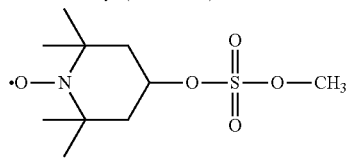
Methyl (4-TEMPO) sulfate
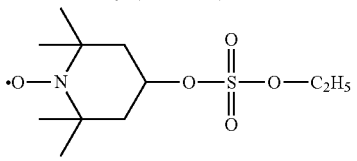
Ethyl (4-TEMPO) sulfate
Other examples are as follows:
Formula 5
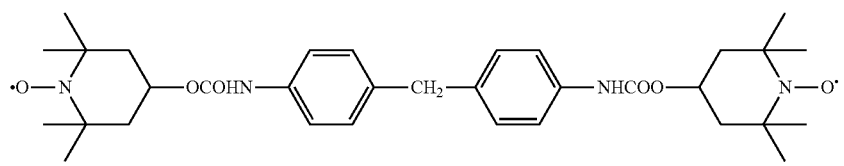
MDP-TEMPO
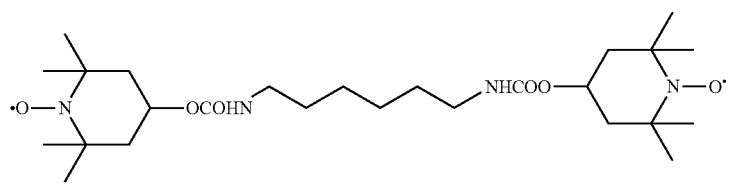
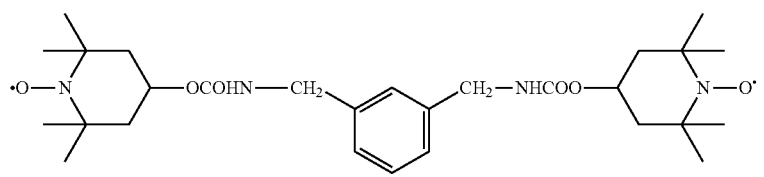
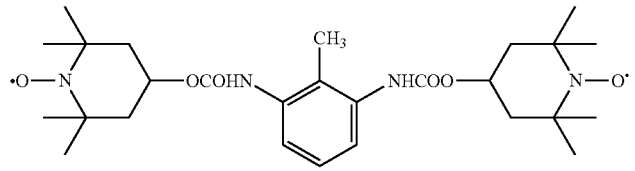
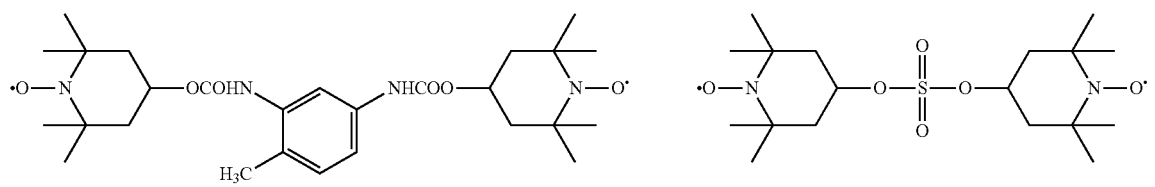

-continued
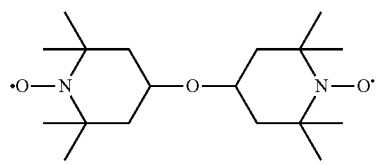
Formula 6
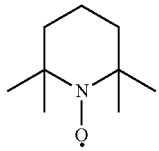
2,2,6,6-tetra-methylpiperidin-1-yloxy
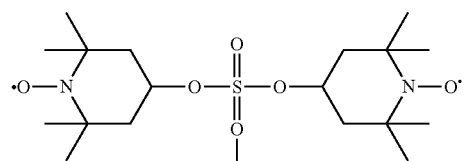
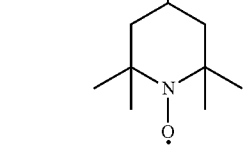
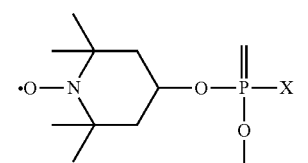
X; Br or Cl
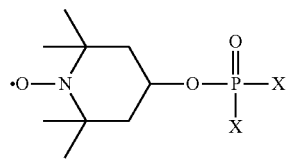
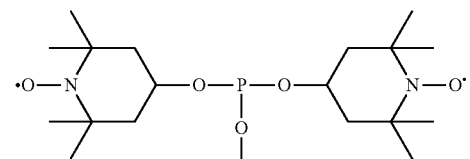
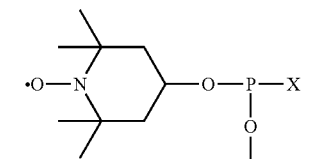
X; Br or Cl
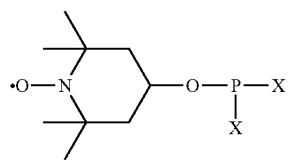
Formula 7
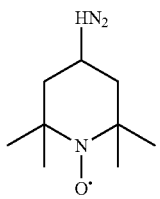
4-amino-2,2,6,6-
tetramethylpiperidinyloxy-
TEMPO
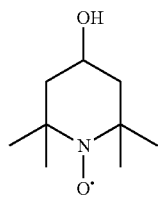
4-hydroxy-TEMPO
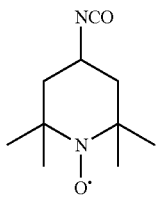
4-isocyanate-TEMPO
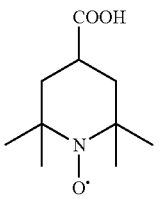
4-carboxyl-TEMPO
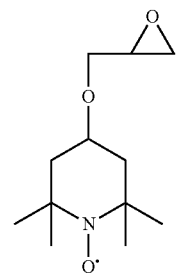
4-TEMPO-
glycidylether -continued
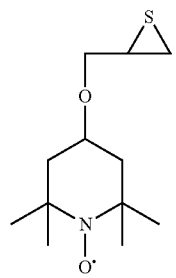
4-TEMPO-thioglycidylether
Formula 8
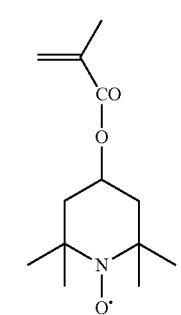
4-methacrylate-TEMPO
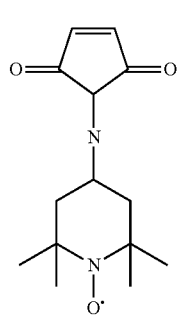
4-maleimide-TEMPO
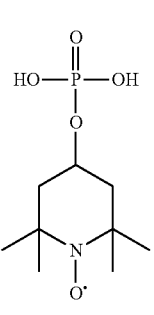
4-phosphonoxy-TEMPO
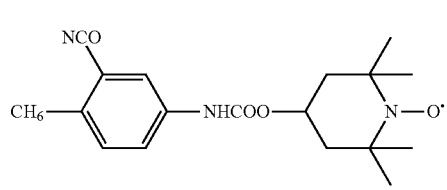
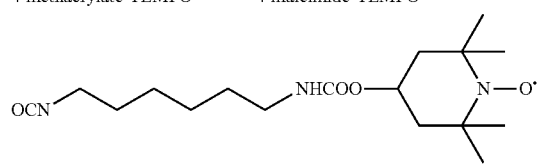
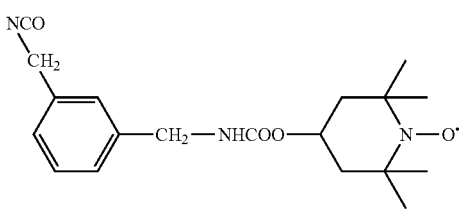
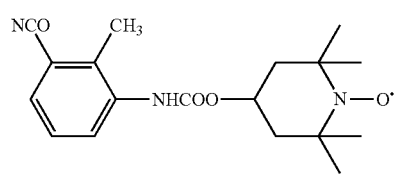
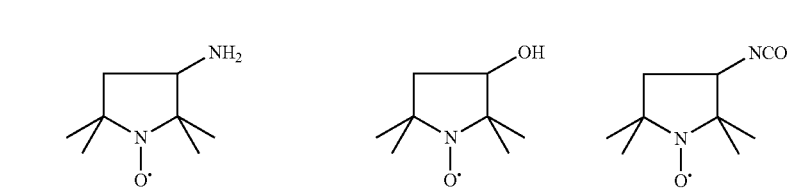
Formula 9
3-amino-2,2,5,5-tetramethyl-1-pyrrolidinyloxy(3-amino-PROXYL)    3-hydroxy-PROXYL    3-isocyanate-PROXYL    3-carboxyl-PROXYL
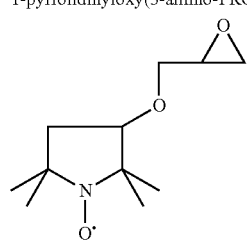
3-PROXYL-glycidylether -continued Formula 10

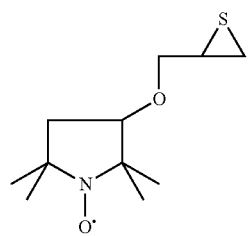
3-PROXYL-thioglycidyl ether

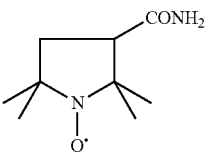
3-carbamoyl-PROXYL

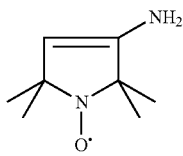
3-amino-2,2,5,5-tetramethyl-3-pyrrolin-1-oxy (3-amino-PRYXYL)

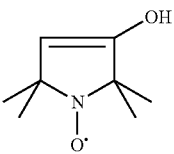
3-hydroxy-PRYXYL

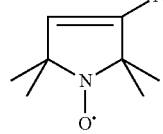
3-isocyanate-PRYXYL

Formula 11

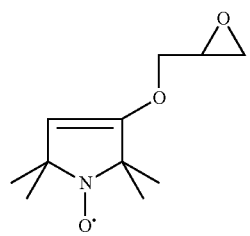
3-PRYXYL-glycidylether

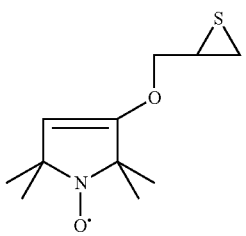
3-PRYXYL-thioglycidylether

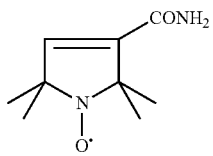
3-carbamoyl-2,2,5,5-tetramethyl-3-pyrrolin-1-yloxy (3-carbamoyl-PRYXYL)

Formula 12

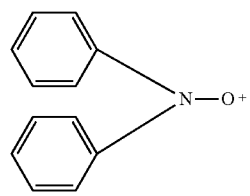
Diphenylnitroxy

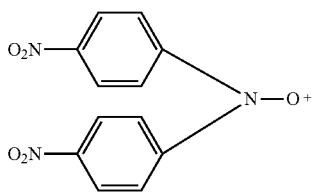
4,4'-dinitro-diphenylnitroxy

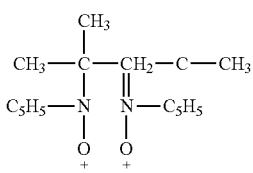
Banfield Kenyon radical

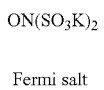
Fermi salt

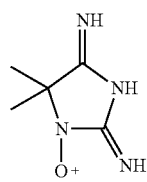
Porphyrexide

Formula 13

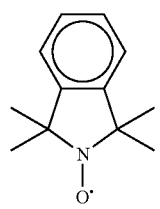
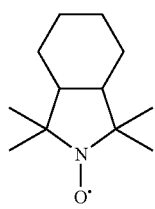
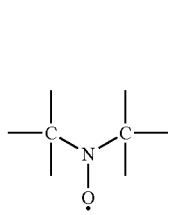

The use amount of the compound (a) usable in the present invention is not particularly limited, but is preferably 0.001 to 0.5 mole, more preferably 0.005 to 0.1 mole, based upon 100 g of the butyl rubber to be modified. If this amount is small, the modification amount of the butyl rubber is liable to become lower, but conversely if large, the subsequent crosslinking is liable to stop proceeding.

As the radical initiator (b) usable in the present invention, it is possible to use any radical initiator capable of introducing the compound (a) into a molecular chain of butyl rubber. Specifically, benzoylperoxide, t-butylperoxybenzoate, dicumylperoxide, t-butylcumylperoxide, di-t-butylperoxide, 2,5-dimethyl-2,5-di-t-butylperoxyhexane, 2,5-dimethyl-2,5-di-t-butylperoxy-3-hexine, 2,4-dichloro-benzoylperoxide, di-t-butylperoxy-di-isopropylbenzene, 1,1-bis(t-butylperoxy)-3,3,5-trimethyl-cyclohexane, n-butyl-4,4-bis(t-butylperoxy)valerate, 2,2-bis(t-butylperoxy)butane, diisobutylperoxide, cumylperoxyneodecanate, di-n-propylperoxydicarbonate, diisopropyl-peroxydicarbonate, di-sec-butylperoxydicarbonate, 1,1,3,3-tetramethylbutylperoxyneodecanate, di(4-t-butylcyclohexyl) peroxydicarbonate, 1-cyclohexyl-1-methylethylperoxyneodecanate, di(2-ethoxyethyl)peroxydicarbonate, di(2-ethoxyhexyl)peroxydicarbonate, t-hexylperoxyneodecanate, dimethoxybutylperoxydicarbonate, t-butylperoxyneodecanate, t-hexylperoxypivalate, t-butylperoxypivalate, di(3,5,5-trimethylhexanoyl)peroxide, di-n-octanoylperoxide, dilauroylperoxide, distearoylperoxide, 1,1,3,3-tetramethylbutylperoxy-2-ethylhexanoate, disuccinic acid peroxide, 2,5-dimethyl-2,5-di(2-ethylhexanoylperoxy)hexane, t-hexylperoxy-2-ethylhexanoate, di(4-methylbenzoyl)peroxide, t-butylperoxy-2-ethylhexanoate, a mixture of di(3-methylbenzoyl)peroxide, benzoyl(3-methylbenzoyl)peroxide and dibenzoylperoxide, dibenzoylperoxide, t-butylperoxyisobutyrate, etc. may be illustrated. Further, as typical examples of initiators able to break down at a low temperature due to the action of a redox catalyst, dibenzoyl peroxide, paramethane hydroperoxide, diisopropylbenzene hydroperoxide, 1,1,3,3-tetramethylbutyl hydroperoxide, cumen hydroperoxide, t-butyl hydroperoxide, etc. may be illustrated. By adding these initiators to the reaction system (i.e., mixture system and catalyst system), it is possible to form carbon radicals in the butyl rubber, to which radicals the compound (a) having stable free radicals is reacted with the carbon radicals to form the intended modified butyl rubber.

The addition amount of the radical initiator (b) in the present invention is not particularly limited, but is preferably 0.001 to 0.5 mole, more preferably 0.005 to 0.2 mole, based upon 100 g of butyl rubber to be modified. If this amount is too small, the amount of hydrogen atoms pulled out from the butyl rubber chain is liable to be decreased, while conversely if too large, the main chain of the butyl rubber is liable to break down and the molecular weight thereof is liable to be greatly decreased.

The two or more bi- or more-functional radical polymerizable monomers (c) usable in the present invention are not particularly limited, but, for example, ethylenedi(meth)acrylate (here the expression "ethylene di(meth)acrylate" means both ethylene dimethacrylate and ethylene diacrylate, the same below), trimethylolpropane tri(meth)acrylate, ethyleneglycol di(meth)acrylate, polyethyleneglycol di(meth)acrylate, 1,6-hexanediol di(meth)acrylate, tetramethylolmethane tri(meth)acrylate, tetramethylolmethane tetra(meth)acrylate, tris(2-hydroxyethyl) isocyanulate tri(meth)acrylate, ethoxylated trimethylolpropane tri(meth)acrylate, pentaerythritol tri(meth)acrylate, ethoxylated trimethylolpropane tri(meth)acrylate, propoxylated trimethylolpropane (meth)acrylate, propoxylated glyceryl(meth)acrylate, pentaerythritol tetra(meth)acrylate, ditrimethylolpropane tetra(meth)acrylate, dipentaerythritol penta(meth)acrylate, ethoxylated pentaerythritol tetra(meth)acrylate, polysiloxane di(meth)acrylate, various types of urethane(meth)acrylate, various types of metal (meth)acrylate, polypropyleneglycol di(meth)acrylate, N,N'-phenylene dimaleimide, bismaleimide diphenylmethane, N,N'-phenylene diacrylamide, divinylbenzene, triallyl isocyanulate, etc. may be mentioned. Among these, monomers including electron acceptor groups in the molecule (e.g., carbonyl groups (i.e., ketones, aldehydes, esters, carboxylic acids, carboxylates and amides), nitro group, cyano group, etc.) are preferable from the viewpoint of increasing the modification rate.

The use amount of the at least two kinds of bi- or more-functional radical polymerizable monomers (c) is not particularly limited, but is preferably 0.001 to 0.5 mole, more preferably 0.005 to 0.2 mole, based upon 100 g of the butyl rubber to be modified. If this amount is too small, the later cross-linking is liable not to proceed, while conversely if too large, the physical properties of the cross-linked product are liable to be deteriorated.

In the present invention, the method for modifying the butyl rubber and the method for mixing the radical polymerizable monomer (c) therewith are not particularly limited, but, for example, butyl rubber may be modified as follows, for example. A premixed mixture of the butyl rubber, the compound (a) and the initiator (b) is reacted in a nitrogen-substituted internal kneader at a temperature of 150 to 220° C. The nitrogen substitution is preferred, but the reaction may also be performed under conditions of lean oxygen. The mixing of two or more types of the monomers (c) may be carried out by a general method. Various types of additives, reinforcing fillers, and cross-linking agents may be simultaneously kneaded. These may be modified and mixed by using an internal kneader, twin-screw extrusion type kneader, single-screw kneader, roll, Banbury mixer, kneader, etc.

The rubber composition according to the present invention preferably further contains, based upon 100 parts by weight of the rubber component containing the modified butyl rubber, reinforcing fillers (e) such as carbon black and/or silica in an amount of 5 to 300 parts by weight, preferably 30 to 200 parts by weight and a cross-linking agent (d) (e.g., benzoylperoxide, t-butylperoxybenzoate, dicumylperoxide, t-butylcumylperoxide, di-t-butylperoxide, 2,5-dimethyl-2,5-di-t-butylperoxyhexane, 2,5-dimethyl-2,5-di-t-butylperoxy-3-hexine, 2,4-dichloro-benzoylperoxide, di-t-butylperoxy-diisopropylbenzene, 1,1-bis(t-butylperoxy)-3,3,5-trimethylcyclohexane, n-butyl-4,4-bis(t-butylperoxy)valerate, 2,2-bis(t-butylperoxy)butane or other organic peroxides and azo dicarbonamide, azobis isobutyronitrile, 2,2'-azobis-(2-amidinopropane)dihydrochloride, dimethyl-2,2'-azobis(isobutyrate), azobis-cyanovaleric acid, 1,1'-azobis-(2,4-dimethylvaleronitrile), azobismethylbutyronitrile, 2,2'-azobis-(4-methoxy-2,4-dimethylvaleronitrile) and other azo-based radical initiators etc.) in an amount of preferably 0.05 to 15 parts by weight, more preferably 0.1 to 10 parts by weight.

The modified butyl rubber composition according to the present invention may contain, as other rubber components, a styrene-isoprene-butadiene copolymer, chloroprene rubber, ethylene-propylene-diene three-way copolymer rubber, ethylene-propylene copolymer, ethylene-propylene-butene three-way copolymer, styrene-butadiene-styrene block copolymer, styrene-isoprene-styrene copolymer, styrene-ethylene-butene-styrene block copolymer, styrene-ethylene-propylene-styrene copolymer, polyethylene, polypropylene, polystyrene, polyaromatic vinyl, polyolefin, polyisoprene, various types of styrene-butadiene copolymer, various types of polybutadiene, acrylonitrile-butadiene copolymer, hydrogenated acrylonitrile-butadiene copolymer, acryl rubber, silicone rubber, fluorine rubber, epichlorohydrin rubber, various types of polymethacrylic acid ester, various types of polyether, various types of polysulfide, various types of polyvinylether, various types of polyester, various types of polyamide, cellulose, starch, various types of polyurethane, various types of polyurea, various types of polyamine, etc., but the amount of the modified butyl rubber is preferably at least 10% by weight in the rubber component.

The rubber composition according to the present invention may contain, in addition to the above components, other fillers, a vulcanization or cross-linking agent, vulcanization or cross-linking accelerator, various types of oils, antioxidant, plasticizer, and other various types of additives generally compounded into rubber compositions for tires and the other rubber products. These additives may be compounded, by a general method to obtain a composition used for vulcanization or cross-linking. The amounts of these additives may be made the conventional general amounts so long as the object of the present invention is not adversely affected.

EXAMPLES

Examples will now be used to further explain the present invention, but the scope of the present invention is by no means limited to these Examples.

The materials used in the following Examples are as follows:

IIR: butyl rubber [made by Bayer, BUTYL301]
1,3-bis-(t-butylperoxyisopropyl)benzene: [made by Kayaku Akzo Corporation, Parkadox 14-G]
OH-TEMPO: 4-hydroxy-2,2,6,6-tetramethylpiperidinyl-1-oxyl [made by Adenka, LA7RD]

Example of Preparation of Modified IIR Composition (OHT-IIR)

IIR 350.0 g, 1,3-bis-(t-butylperoxyisopropyl)benzene 24.2 g and OH-TEMPO 32.2 g were charged into an internal Banbury mixer set to a temperature of 60° C. and mixed for 10 minutes. The mixture thus obtained was kneaded in an internal Banbury mixer set to a temperature of 100° C., while the inside of the mixer was substituted with nitrogen for 5 minutes. While kneading, the temperature was raised to 165° C. and the kneading was continued for 20 minutes. Part of the polymer thus obtained was dissolved in toluene, then the polymer was isolated and purified by a reprecipitation operation. The purified product was used for analyzing by 1H-NMR, the introduction of a TEMPO site (alkoxyamino group) was confirmed. The rate of introduction was 0.317 mol %.

Example 1 to 6, Comparative Example 1 and Reference Examples 1 to 11

Each formulation (parts by weight) shown in Table I were kneaded in a 150 cc kneader for 6 minutes. Acrylate was added and further kneaded by an 8-inch open roll to obtain a rubber composition. The rubber composition thus obtained was press vulcanized at 180° C. for 20 minutes to form a 2 mm thick sheet. From this sheet, a No. 3 dumbbell test piece was punched out and subjected to a tensile test according to JIS K 6251 to obtain the 50% modulus, the tensile strength at break and the elongation at break. The results are shown in Table I.

TABLE I

|  | Comp. Ex. 1 | Ref. Ex. 1 | Ref. Ex. 2 | Ref. Ex. 3 | Ref. Ex. 4 | Ref. Ex. 5 |
|---|---|---|---|---|---|---|
| Formulation (parts by weight) | | | | | | |
| OHT-IIR (rate of introduction: 0.317 mol) | 100 | 100 | 100 | 100 | 100 | 100 |
| Carbon black (GPF)[2] | 50 | 50 | 50 | 50 | 50 | 50 |
| Talc[3] | 100 | 100 | 100 | 100 | 100 | 100 |
| Stearic acid[4] | 1 | 1 | 1 | 1 | 1 | 1 |
| DCP (40% diluted)[5] | 3.7 | 3.7 | 3.7 | 3.7 | 3.7 | 3.7 |
| Zinc White[6] | 5 | 5 | 5 | 5 | 5 | 5 |
| A-TMPT (trifunctional)[7] | — | 3.51 | 5.27 | 10.5 | — | — |
| SR-355 (tetrafunctional)[8] | — | — | — | — | 2.14 | 4.28 |
| A-DPH (hexafunctional)[9] | — | — | — | — | — | — |
| (Total amount of co-cross-linking agent) | (—) | (3.51) | (5.27) | (10.5) | (2.14) | (4.28) |
| Tensile test | | | | | | |
| 50% modulus (MPa) | Sheet cannot be formed | 1.37 | 1.72 | 2.48 | 1.25 | 1.59 |
| Tensile strength at break (MPa) |  | 2.96 | 3.17 | 3.55 | 2.63 | 2.93 |
| Elongation at break (%) |  | 440 | 333 | 202 | 459 | 358 |

|  | Ref. Ex. 6 | Ref. Ex. 7 | Ref. Ex. 8 | Ref. Ex. 9 | Ref. Ex. 10 | Ref. Ex. 11 |
|---|---|---|---|---|---|---|
| Formulation (parts by weight) | | | | | | |
| OHT-IIR (rate of introduction: 0.317 mol) | 100 | 100 | 100 | 100 | 100 | 100 |
| Carbon black (GPF)[2] | 50 | 50 | 50 | 50 | 50 | 50 |
| Talc[3] | 100 | 100 | 100 | 100 | 100 | 100 |
| Stearic acid[4] | 1 | 1 | 1 | 1 | 1 | 1 |
| DCP (40% diluted)[5] | 3.7 | 3.7 | 3.7 | 3.7 | 3.7 | 3.7 |
| Zinc White[6] | 5 | 5 | 5 | 5 | 5 | 5 |
| A-TMPT (trifunctional)[7] | — | — | — | — | — | — |
| SR-355 (tetrafunctional)[8] | 6.42 | 12.8 | — | — | — | — |
| A-DPH (hexafunctional)[9] | — | — | 1.71 | 3.42 | 5.13 | 10.3 |
| (Total amount of co-cross-linking agent) | (6.42) | (12.8) | (1.71) | (3.42) | (5.13) | (10.3) |
| Tensile test | | | | | | |
| 50% modulus (MPa) | 1.93 | 2.75 | 1.30 | 1.61 | 1.86 | 2.52 |
| Tensile strength at break (MPa) | 3.04 | 3.36 | 2.20 | 2.43 | 2.60 | 2.98 |
| Elongation at break (%) | 269 | 150 | 458 | 331 | 239 | 156 |

|  | Ex. 1 | Ex. 2 | Ex. 3 | Ex. 4 | Ex. 5 | Ex. 6 |
|---|---|---|---|---|---|---|
| Formulation (parts by weight) | | | | | | |
| OHT-IIR (rate of introduction: 0.317 mol) | 100 | 100 | 100 | 100 | 100 | 100 |
| Carbon black (GPF)[2] | 50 | 50 | 50 | 50 | 50 | 50 |
| Talc[3] | 100 | 100 | 100 | 100 | 100 | 100 |
| Stearic acid[4] | 1 | 1 | 1 | 1 | 1 | 1 |
| DCP (40% diluted)[5] | 3.7 | 3.7 | 3.7 | 3.7 | 3.7 | 3.7 |
| Zinc White[6] | 5 | 5 | 5 | 5 | 5 | 5 |
| A-TMPT (trifunctional)[7] | 5.27 | 5.27 | 5.27 | 5.27 | — | — |

TABLE I-continued

| | | | | | | |
|---|---|---|---|---|---|---|
| SR-355 (tetrafunctional)[8] | 4.28 | 6.42 | — | — | 6.42 | 6.42 |
| A-DPH (hexafunctional)[9] | — | — | 3.42 | 5.13 | 1.71 | 5.13 |
| (Total amount of co-cross-linking agent) | (9.55) | (11.69) | (8.69) | (10.4) | (8.13) | (11.55) |
| Tensile test | | | | | | |
| 50% modulus (MPa) | 2.53 | 2.69 | 2.41 | 2.70 | 2.74 | 2.83 |
| Tensile strength at break (MPa) | 3.48 | 3.47 | 3.37 | 3.53 | 3.44 | 3.43 |
| Elongation at break (%) | 219 | 169 | 225 | 188 | 182 | 176 |

Notes to Table I
[1] See Example of Preparation
[2] Asahi #50: made by Asahi Carbon
[3] Talc F: made by Nippon Talc
[4] Beads Stearic Acid YR: made by NOF Corporation
[5] Dicumyl peroxide: made by NOF Corporation, Percumyl D
[6] Zinc White Type 3: made by Seido Chemical Industrial
[7] Trimethylolpropane trimethacrylate: made by Shin-Nakamura Chemical, NK ester A-TMPT
[8] Ditrimethylolpropane tetraacrylate: made by Sartomer, SR-355
[9] Dipentaerythritol hexaacrylate: made by Shin-Nakamura Chemical, A-DPH

INDUSTRIAL APPLICABILITY

As explained above, according to the present invention, by adding at least two kinds of bi- or more-functional radical polymerizable monomers (c) to butyl rubber modified using a compound (a) having a nitroxide-free radical in the molecule, stable at an ordinary temperature even in the presence of oxygen, such as a TEMPO derivative, and a radical initiator (b), it is possible to obtain a modified butyl rubber composition capable of cross-linking with an organic peroxide, while by using two or more types of a radical polymerizable monomer, it is possible to increase the tensile properties of the cross-linked product even if the use amount of the polymerizable monomer is decreased, and, therefore, it is possible to sufficiently maintain the properties of butyl rubber such as the heat resistance, the air barrier property, the vibration absorption, etc. and possible to use as tire tubes, bladders, roofings, conveyor belts, hoses, cables, vibration absorbing rubber, electronic parts, various types of industrial products, etc.

The invention claimed is:

1. A modified butyl rubber composition comprising (I) a modified butyl rubber, obtained by a modification reaction of 100 g of a butyl rubber in the presence of 0.001 to 0.5 mole of a compound (a) having a nitroxide-free radical, stable in the presence of oxygen at an ordinary temperature, in the molecule thereof and a radical initiator (b), (II) at least two kinds of bi- or more-functional radical polymerizable monomers (c) and (III) an organic peroxide, as a cross-linking agent (d), in an amount of 0.05 to 15 parts by weight, based upon 100 parts by weight of the rubber composition containing the modified butyl rubber.

2. A modified butyl rubber composition as claimed in claim 1, wherein said at least two kinds of bi- or more-functional radical polymerizable monomers (c) are monomers having an electron acceptor group.

3. A modified butyl rubber composition as claimed in claim 1, further comprising a cross-linking agent (d) in an amount of 0.1 to 10 parts by weight, based upon 100 parts by weight of the rubber component containing the modified butyl rubber.

4. A modified butyl rubber composition as claimed in claim 1, further comprising a reinforcing filler (e) in an amount of 5 to 300 parts by weight, based upon 100 parts by weight of the rubber component containing the modified butyl rubber.

5. A modified butyl rubber composition as claimed in claim 2, further comprising a reinforcing filler (e) in an amount of 5 to 300 parts by weight, based upon 100 parts by weight of the rubber component containing the modified butyl rubber.

* * * * *